United States Patent [19]

Ferguson

[11] Patent Number: 4,703,191
[45] Date of Patent: Oct. 27, 1987

[54] RESERVE POWER SOURCE WITH POWER FAILURE DETECTION APPARATUS

[75] Inventor: Frank T. Ferguson, Oklahoma City, Okla.

[73] Assignee: Control Technology, Inc., Oklahoma City, Okla.

[21] Appl. No.: 806,800

[22] Filed: Dec. 9, 1985

[51] Int. Cl.$^4$ .............................................. H02H 3/28
[52] U.S. Cl. ......................................... 307/64; 307/66; 307/85; 307/87; 361/90; 361/91; 361/92; 361/93
[58] Field of Search ........................ 307/43, 44, 45, 54, 307/63, 64, 65, 66, 70, 71, 72, 73, 75, 77, 80, 85, 86, 87; 361/93, 94, 95, 96, 97, 92, 91, 90, 89, 88, 87, 86, 85, 79, 42, 56, 57, 60, 65; 323/234, 235, 244, 246

[56] References Cited

U.S. PATENT DOCUMENTS

| | | | |
|---|---|---|---|
| 3,337,743 | 8/1967 | Rolfes | 307/64 X |
| 3,535,591 | 10/1970 | Holmquest | 361/90 X |
| 3,564,275 | 2/1971 | Eberle | 307/87 X |
| 3,794,846 | 2/1974 | Schlicher et al. | 307/87 |
| 3,813,667 | 5/1974 | Smith | 361/90 X |
| 4,038,559 | 7/1977 | Chun et al. . | |
| 4,048,552 | 9/1977 | Stone . | |
| 4,090,090 | 5/1978 | Johnston | 307/64 X |
| 4,099,066 | 7/1978 | Beggs . | |
| 4,109,161 | 8/1978 | Iijima . | |
| 4,122,359 | 10/1978 | Briekss . | |
| 4,143,283 | 3/1979 | Graf et al. . | |
| 4,167,680 | 9/1979 | Gross . | |
| 4,241,261 | 12/1980 | Ebert | 307/64 X |
| 4,277,692 | 7/1981 | Small . | |
| 4,281,376 | 7/1981 | Münchow et al. | 307/87 X |
| 4,281,625 | 8/1980 | Beckwith et al. | 307/87 |
| 4,315,162 | 2/1982 | Ferguson . | |
| 4,331,995 | 5/1982 | Voss | 361/92 X |
| 4,362,951 | 12/1982 | Turner et al. . | |
| 4,383,184 | 5/1983 | McFarland | 307/66 |
| 4,384,214 | 5/1983 | Crick et al. . | |
| 4,400,625 | 8/1983 | Hussey . | |
| 4,508,974 | 4/1985 | Henderson | 307/66 |
| 4,564,767 | 1/1986 | Charych | 307/48 X |
| 4,589,073 | 5/1986 | Kidd | 361/93 X |
| 4,600,962 | 7/1986 | Bliehall | 361/92 X |

Primary Examiner—William M. Shoop, Jr.
Assistant Examiner—Skik Luen Paul Ip
Attorney, Agent, or Firm—Laney, Dougherty, Hessin & Beavers

[57] ABSTRACT

A reserve power source, switchably connected to a network between a primary power supply and a load, provides an auxiliary power signal to the load when a power failure condition is detected in the signal from the primary power supply. The reserve power source includes a circuit for instantaneously detecting and switching upon the occurrence of a power outage. An overvoltage/noise detector circuit is included to detect when either a sustained overvoltage condition or a high, short duration overvoltage condition occurs. A low voltage detector circuit is included for detecting a low voltage, or brown-out, condition. When an overvoltage or low voltage condition is detected, a preferred embodiment of the invention switches the load to the auxiliary power signal within one-half cycle of, but in zero-crossing synchronization with, the primary power signal.

18 Claims, 16 Drawing Figures

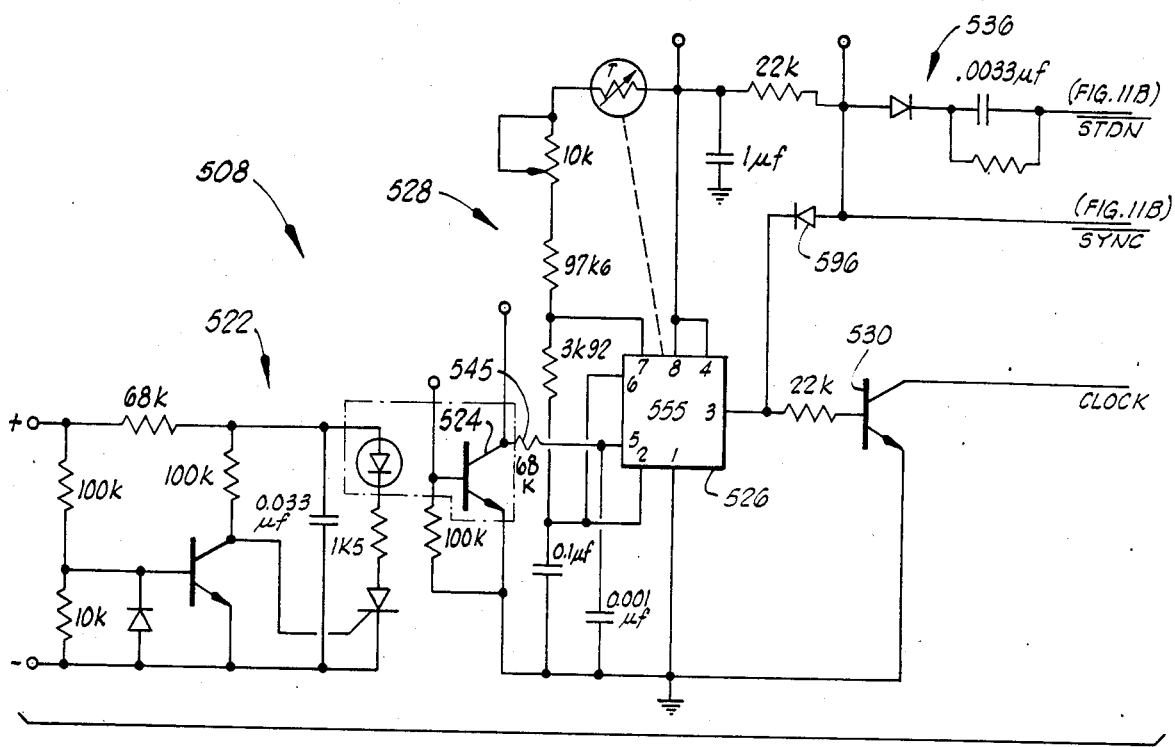
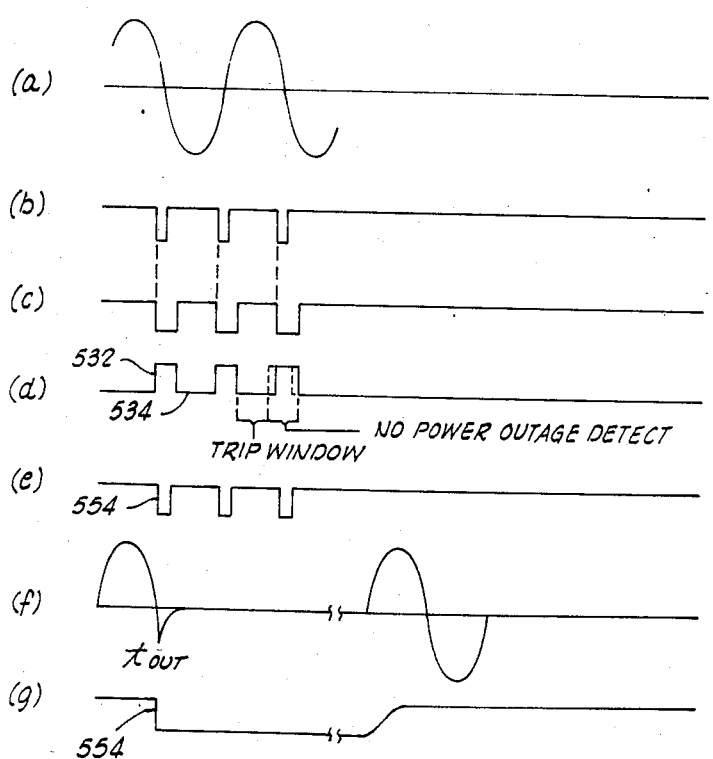
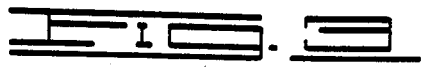

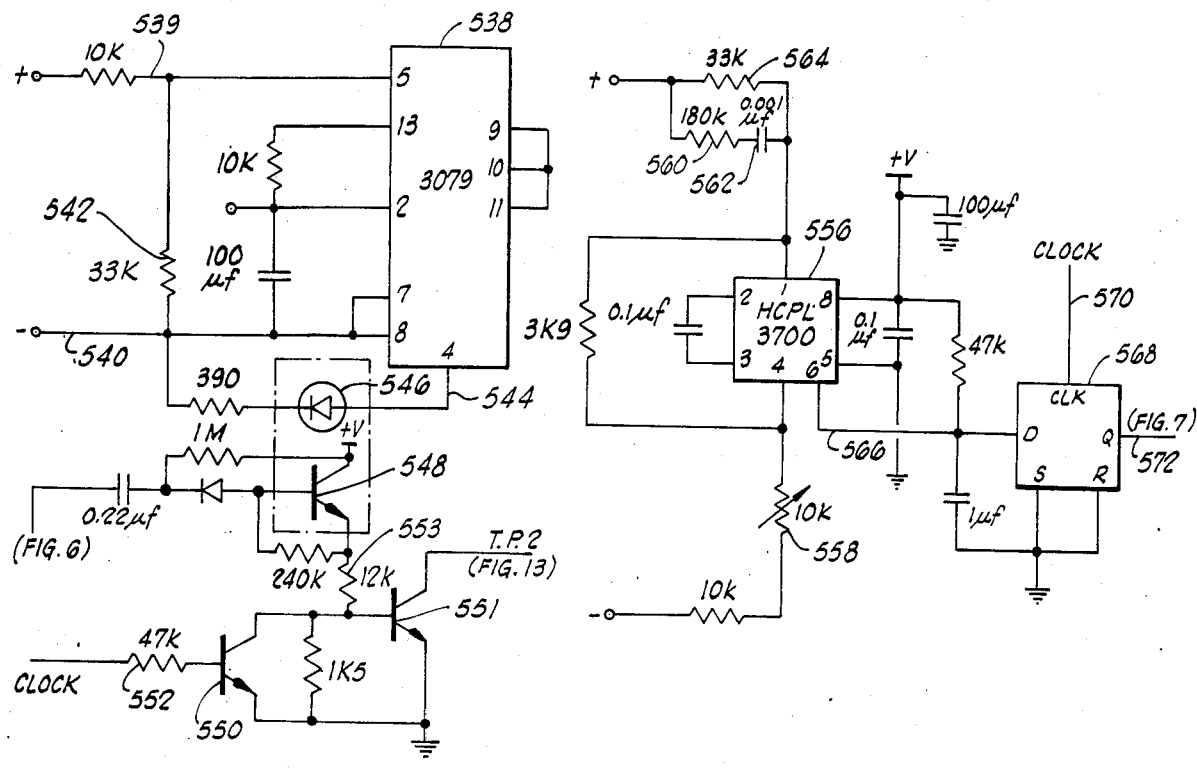
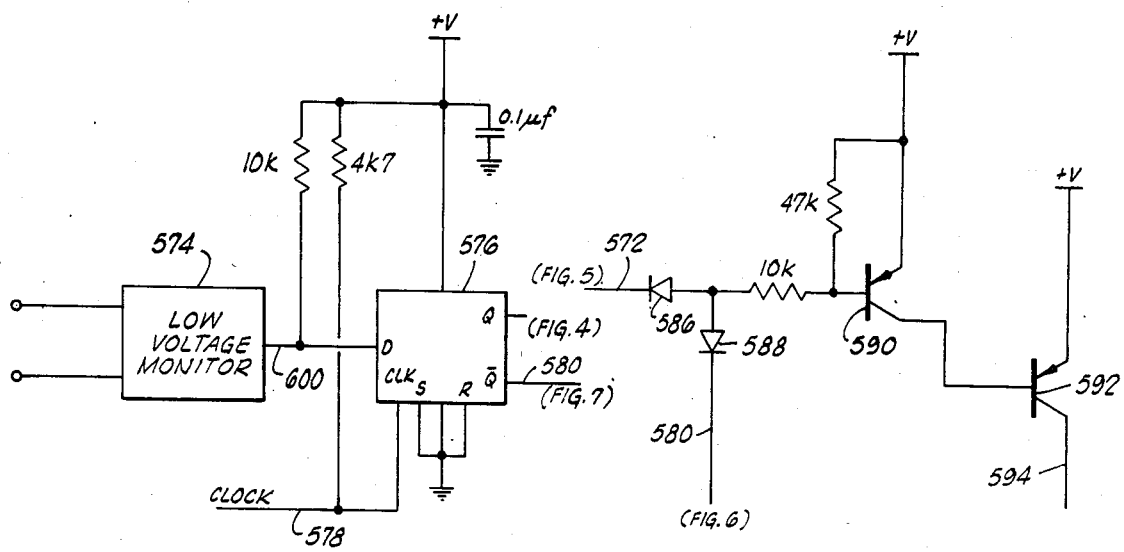

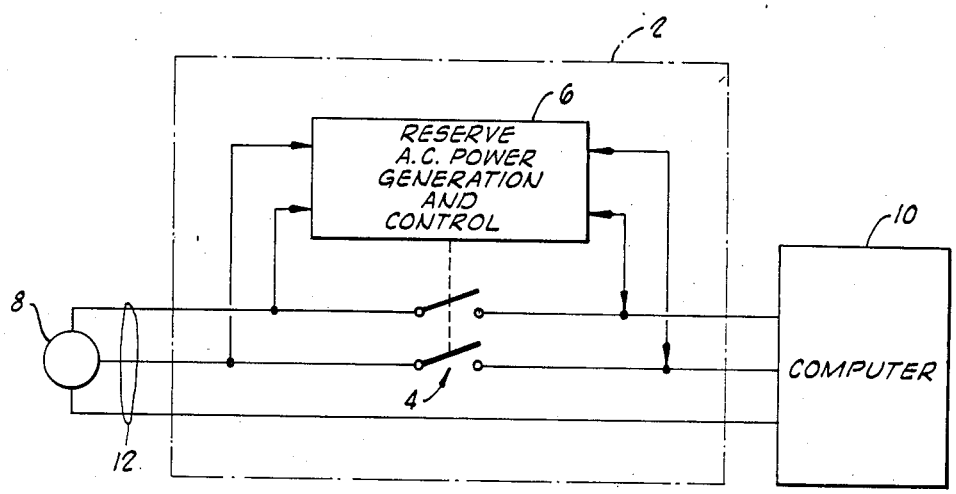
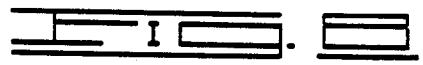
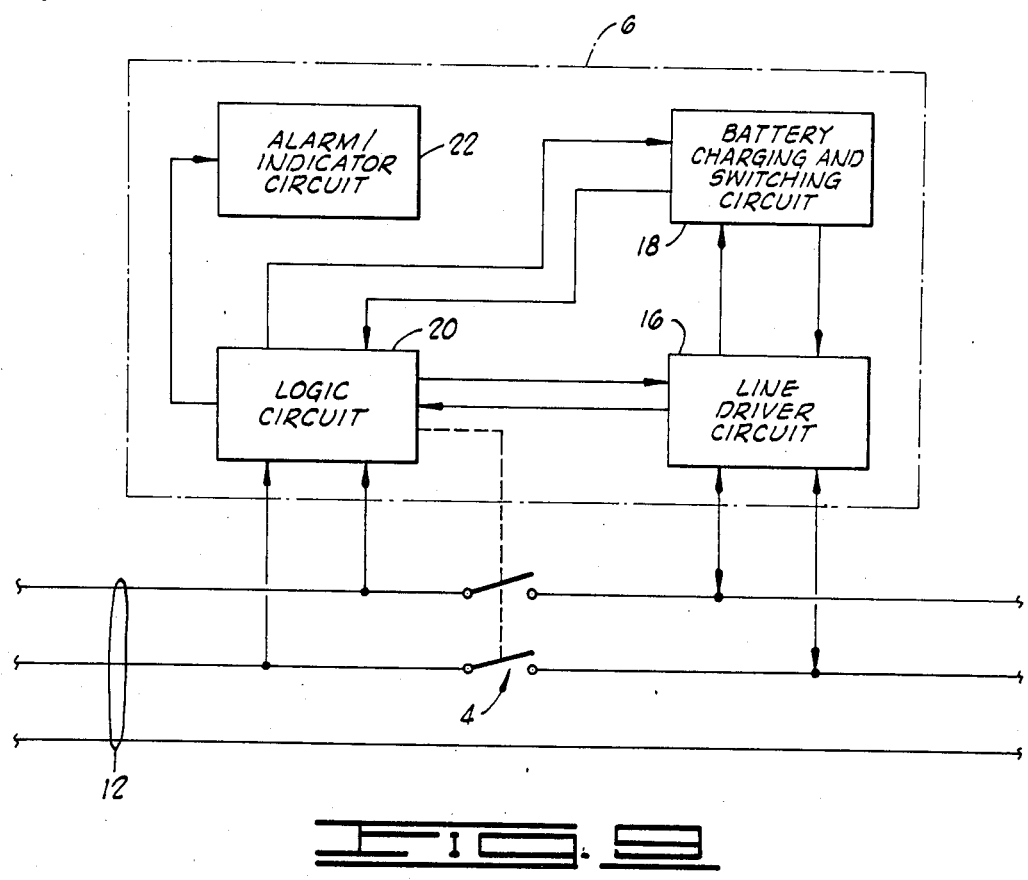
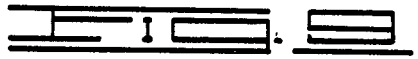

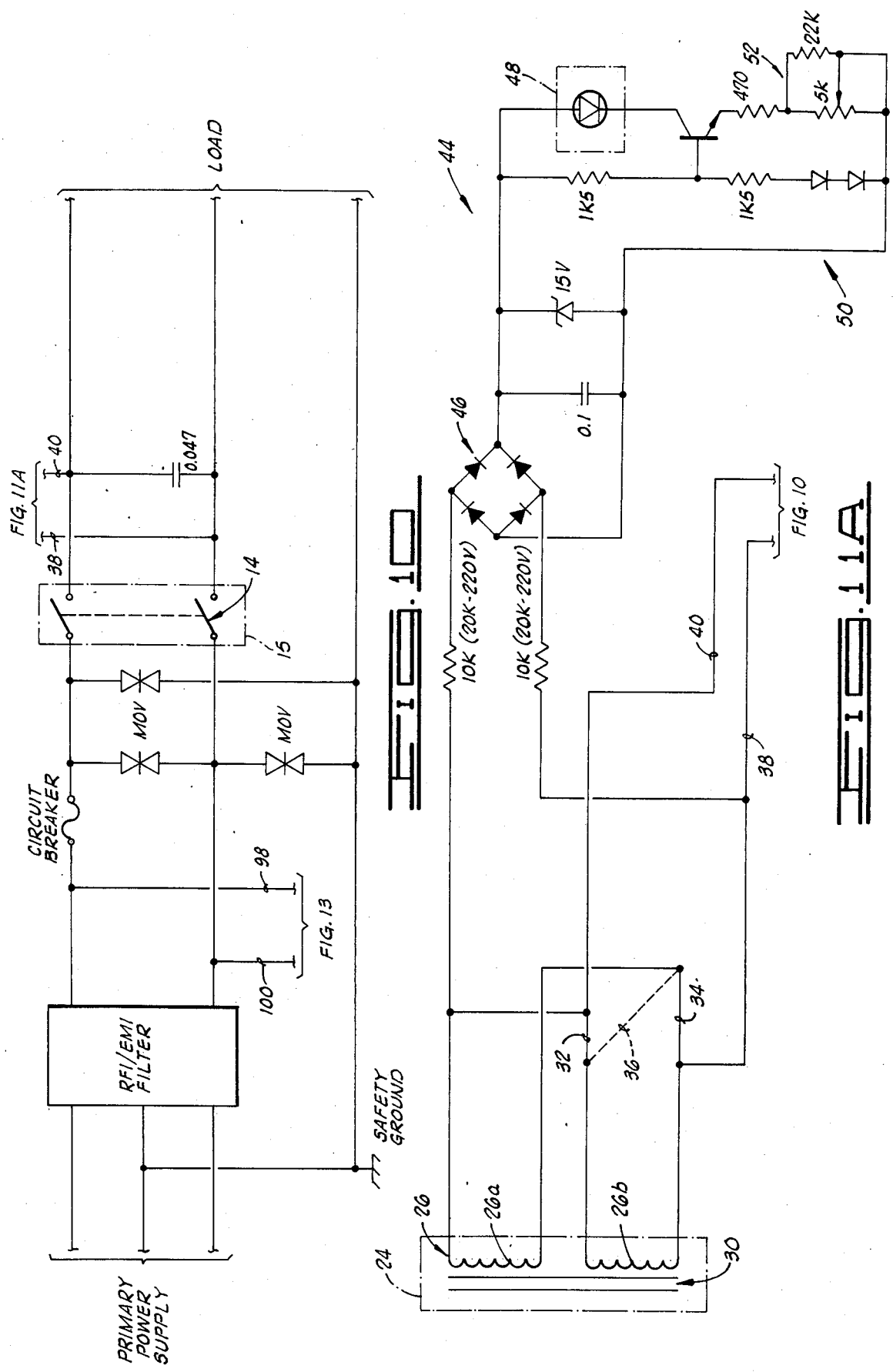

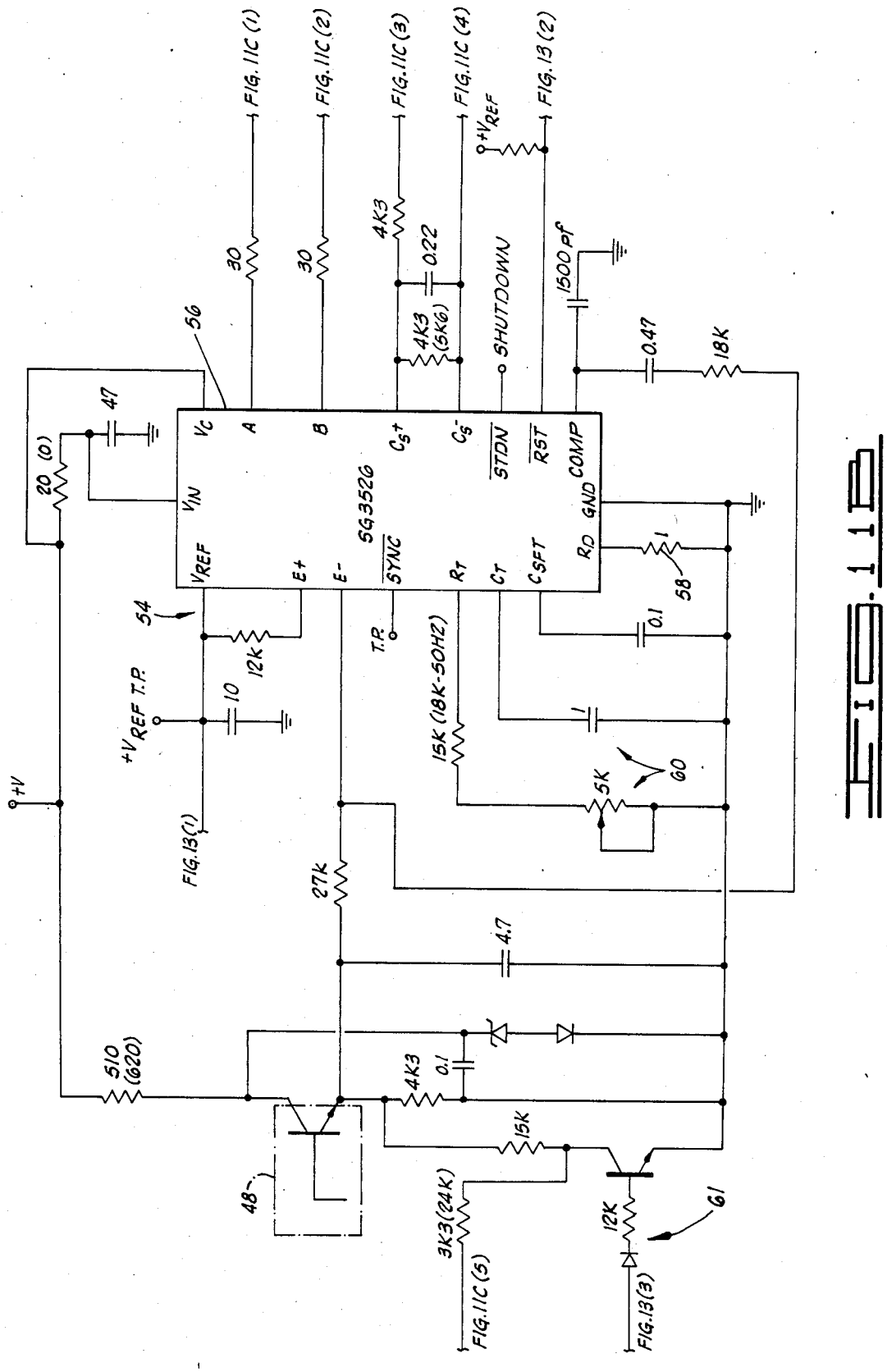

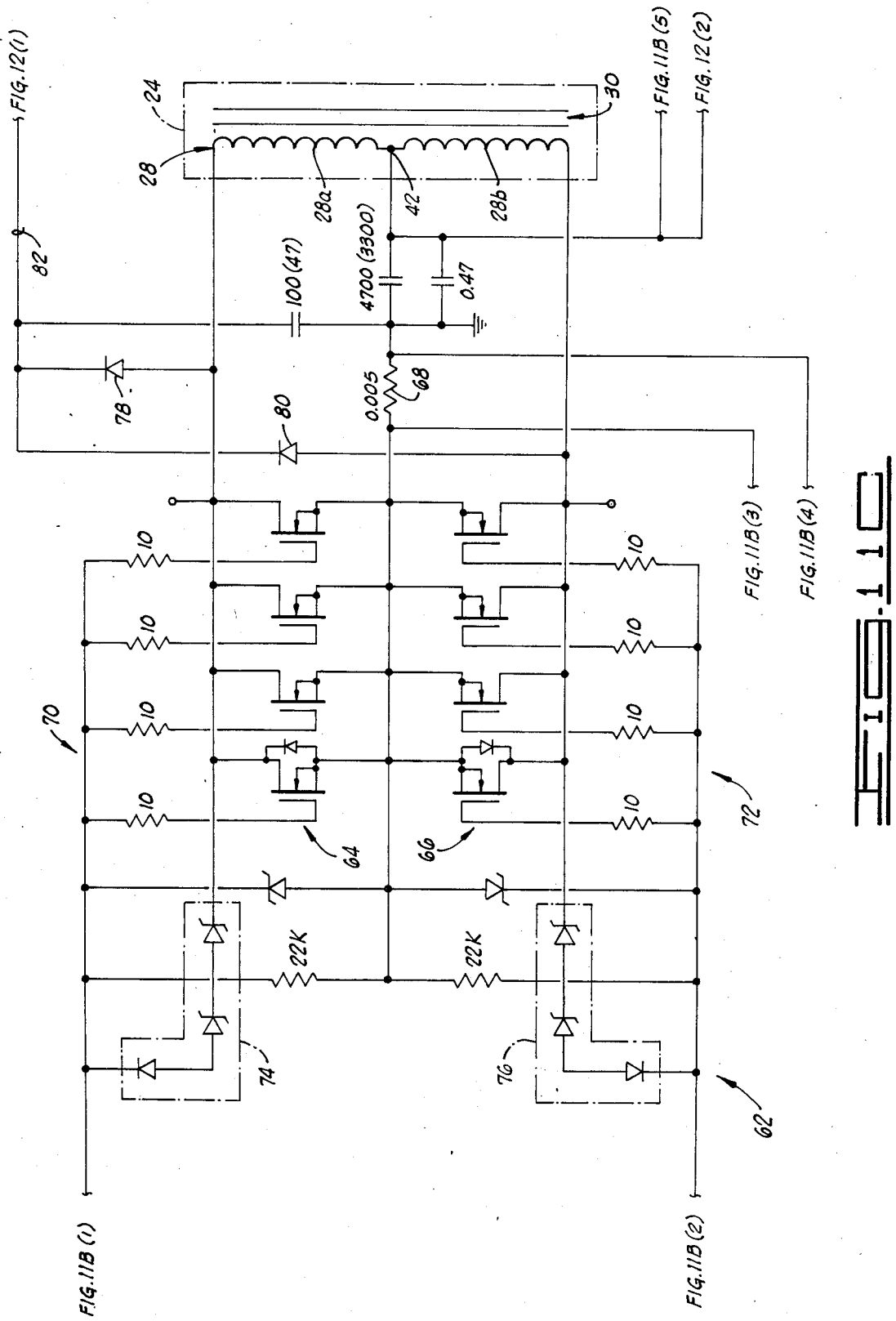

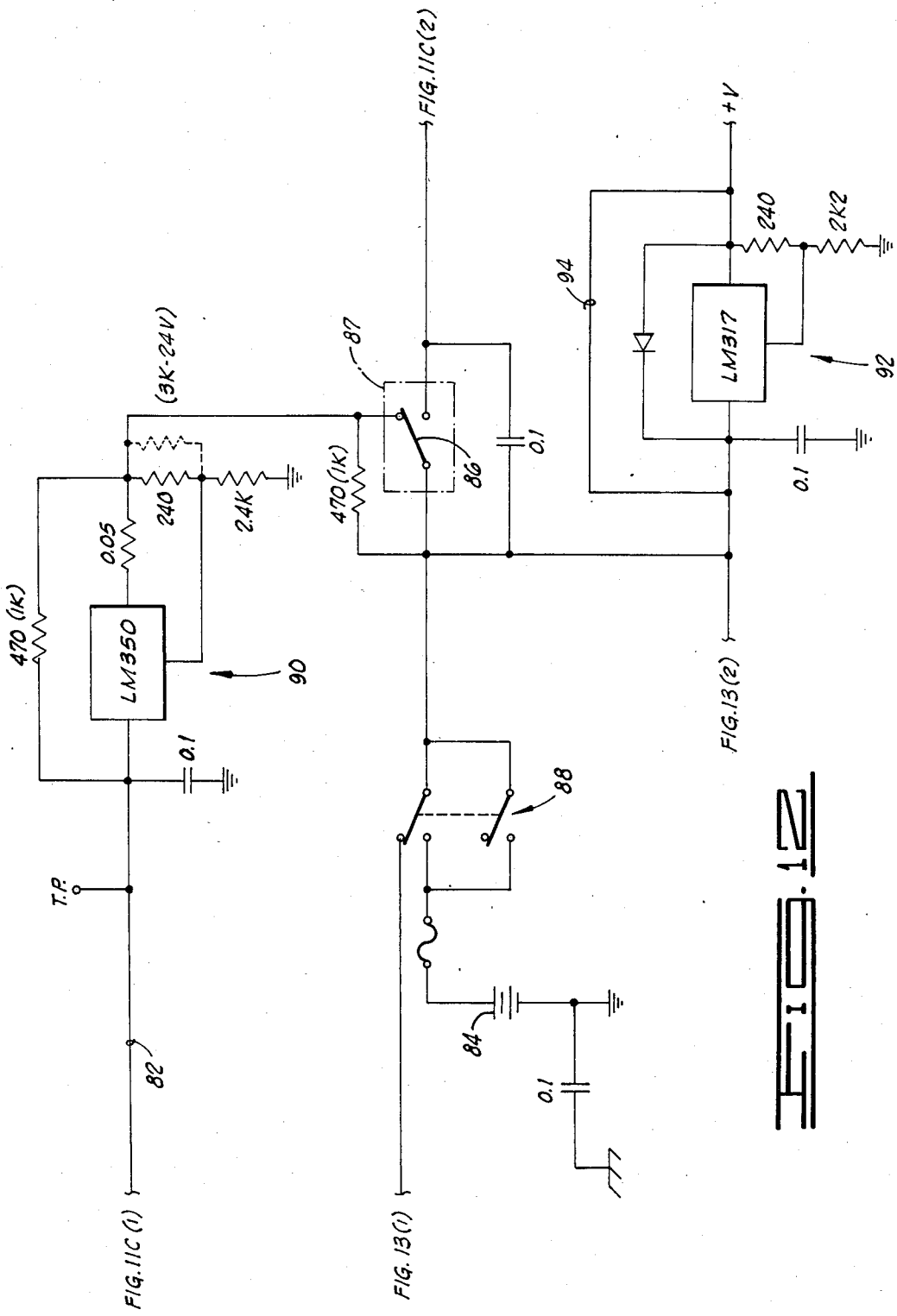

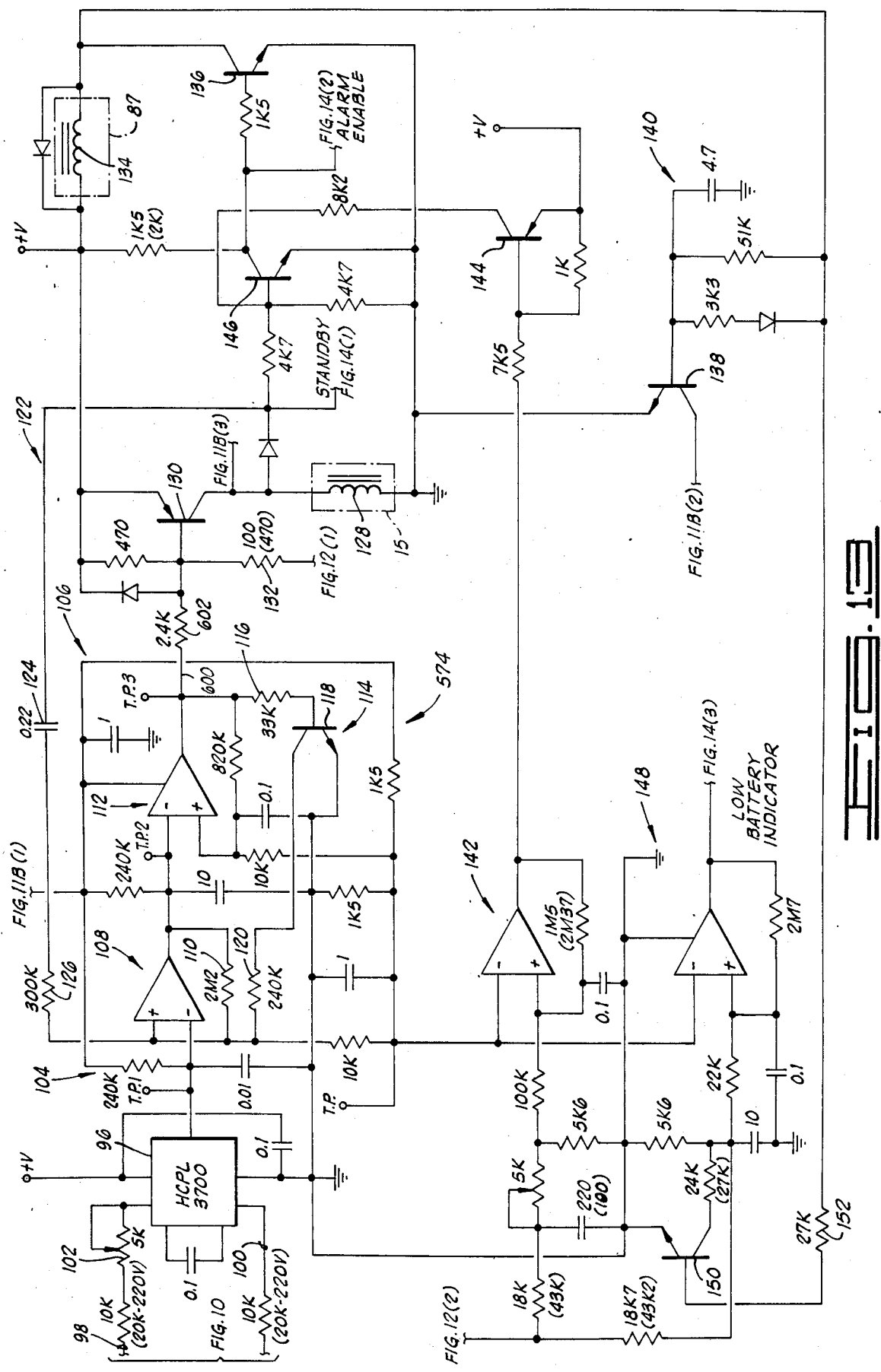

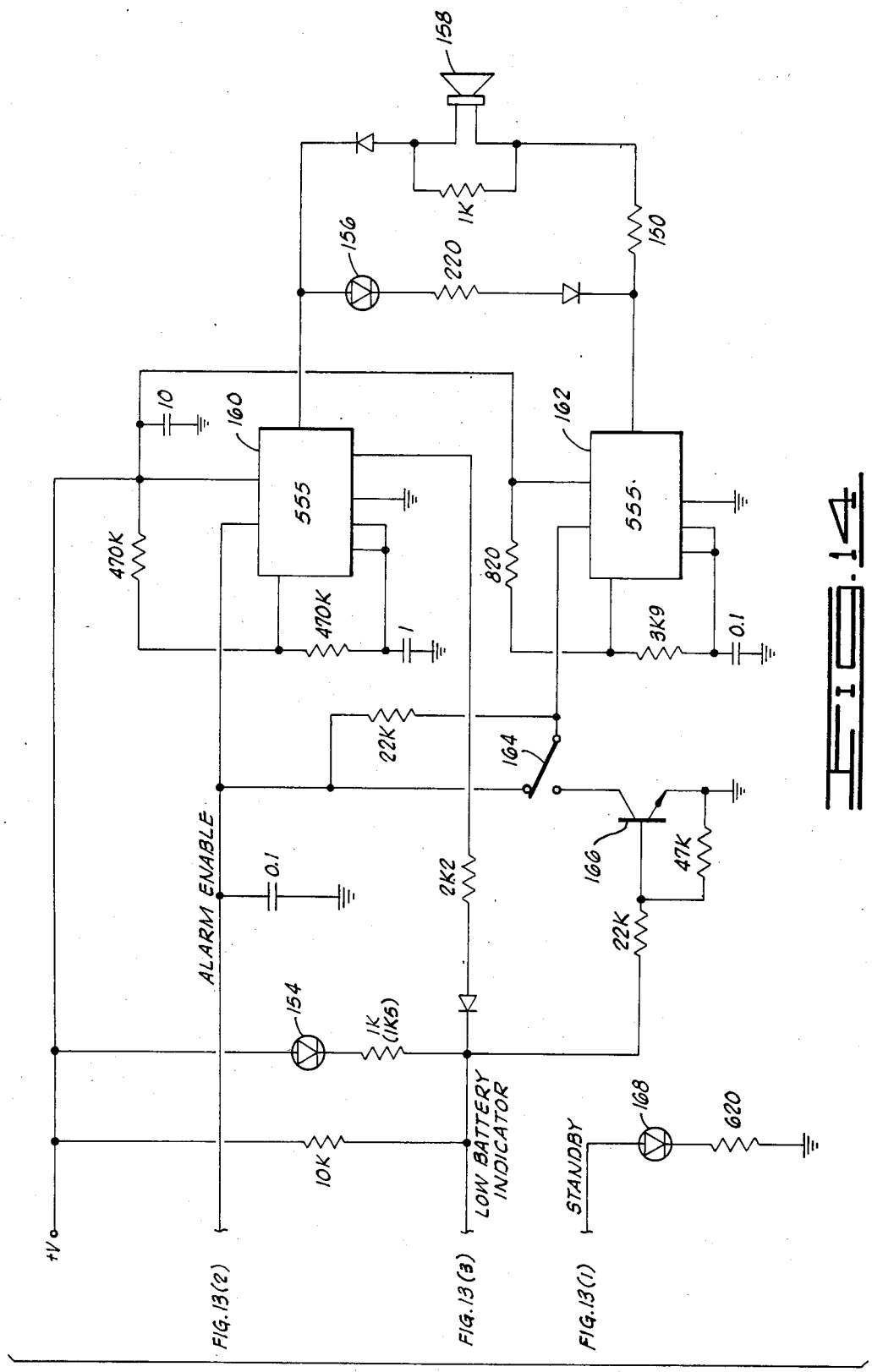

RESERVE POWER SOURCE WITH POWER FAILURE DETECTION APPARATUS

BACKGROUND OF THE INVENTION

This invention relates generally to a reserve power source synchronized with a primary power signal on a primary power line to switch a load to an auxiliary power signal when at least one of a plurality of power failure conditions is detected in the primary power signal. More particularly, but not by way of limitation, the present invention relates to a computer back-up power source which switches the computer, or parts thereof, from a conventional power line to a reserve power line and from the reserve power line back to the conventional power line in synchronization with zero-crossings of the conventional power signal.

Reserve power supplies are, as is well known in the art, needed for protecting computers when a primary power supply, such as is obtained through a conventional AC outlet, exhibits a problem which could adversely affect the operation of the computer. In particular, data can be lost when there is a problem with the primary power supply. To provide adequate protection to a computer, for example, there is the need to be able to detect various power failure conditions in the primary power signal so that the reserve power source can be switched to the computer upon the occurrence of one of such conditions. This detection and the switching needs to be done quickly to avoid an interruption in the power provided to the computer because an interruption of even a few milliseconds can in some cases be disastrous to the operation of the computer.

Various conditions within the primary power signal can indicate a power failure of the type for which switching to the reserve power source is required. A total loss of the signal and a sustained decrease in the voltage magnitude of the primary power signal are two conditions which should be monitored. These conditions are respectively referred to as a power outage (total loss of the voltage signal) and a power brown-out (a reduction of the voltage below a load-operational minimum). Another condition which needs to be monitored is that of an overvoltage wherein the primary power signal exceeds what the load can safely handle. This can occur by, for example, a sustained excessive voltage magnitude or a temporary, but very high excessive voltage.

In addition to simply detecting one or more of the foregoing conditions, it is also desirable that when a power outage is detected, the reserve power supply be instantaneously switched into the circuit for driving the load. This instantaneous switching is particularly critical when a computer is included in the load because a power outage immediately creates the potential for interrupting the computer sufficiently that data storage and other operational abilities can be lost. An excessive power condition or a power brown-out condition is not as critical as a power outage if the high voltage or low voltage condition is detected within one half cycle (i.e., within a few milliseconds) of the primary power signal because the computer equipment can better withstand an overvoltage or reduced voltage condition, rather than a total outage condition, for such a relatively longer period of time.

Regardless of the power failure condition that is detected, it is desirable that the switchover between the primary power line and the reserve power line be made in phase, or in synchronization, with the primary power signal so that out-of-phase switchover problems, such as transformer saturation, will not occur.

Although these needs have been known and reserve power sources have been proposed or manufactured which address at least some of these needs, I am not aware of a reserve power source which can meet all of these needs in the relatively simple and inexpensive manner as provided by the present invention.

SUMMARY OF THE INVENTION

The present invention satisfies the aforementioned needs by providing a novel and improved line synchronized reserve power source with power failure detection apparatus. The present invention can detect at least one of several different power failure conditions and can thereupon switch from a primary power signal to an auxiliary power signal either instantaneously or within one half cycle of the primary power signal frequency, depending on the abnormal power condition. In the preferred embodiment, the present invention can detect and switch in response to a power outage, a low voltage (brown-out) condition, or an overvoltage/noise condition.

Broadly, the present invention provides a line synchronized reserve power source for switchably providing an auxiliary power signal to a load when at least one of a plurality of conditions is detected in a primary power signal provided to the load from a primary power supply. The reserve power source comprises auxiliary power means for providing the auxiliary power signal and switch means for connecting the primary power supply with the load when the switch means is in a first state and for connecting the auxiliary power means with the load when the switch means is in a second state. The reserve power source further comprises clock means for providing a periodic clock signal synchronized with a zero-crossing of the primary power signal. In the preferred embodiment the reserve power source further comprises power outage detector means for detecting a first condition wherein a total outage of the primary power signal occurs; and it includes overvoltage detector means for detecting a second condition wherein the primary power signal includes an excessive voltage or sufficiently high noise above a predetermined frequency; and it comprises low voltage or brown-out detector means for detecting a third condition wherein the primary power signal is less than a predetermined threshold value. Each of these detector means includes means for providing a respective switch control signal in synchronization with the clock signal when the respective condition is detected. The present invention further includes switch control means, responsive to the switch control signals, for placing the switch means in the second state when at least one of the conditions is detected, whereby the auxiliary power signal is provided to the load in synchronization with a zero-crossing of a cycle of the primary power supply. Switchback to the primary power signal after correction of any power failure condition occurs in synchronization with a zero-crossing.

In the preferred embodiment, the power outage detector means includes pulse generating means for generating a control pulse commencing when a first magnitude of the primary power signal is detected prior to a respective zero-crossing of the primary power signal and terminating when a second magnitude of the primary power signal is detected after the respective zero-crossing of the primary power signal. The power outage detector means of the preferred embodiment also broadly includes power failure determining means, responsive to the clock signal and the control pulse, for determining a power failure condition wherein at least a portion of the control pulse exists during a "trip window" portion of the clock signal and for providing the respective switch control signal at such time.

In the preferred embodiment, the overvoltage detector means includes means for setting a predetermined threshold value, means for varying the predetermined threshold value when noise above a predetermined frequency is detected in the primary power signal, means for comparing the primary power signal with the threshold value so that a threshold exceeded signal is generated when the primary power signal exceeds the threshold value, and means for providing the respective switch control signal in synchronization with the clock signal and in response to the threshold exceeded signal.

In the preferred embodiment, the low voltage or brown-out detector means is somewhat similar to the overvoltage detector means in that the low voltage detector means compares the primary power signal with a threshold value, which value in this detector means represents a low voltage indicating threshold.

Therefore, from the foregoing, it is a general object of the present invention to provide a novel and improved line synchronized power reserve supply with power failure detection apparatus. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 2 is a schematic circuit diagram showing the preferred embodiment of the line synchronized clock depicted in FIG. 1.

FIG. 3 is a timing diagram showing relationships among various signals within the preferred embodiment of the present invention.

FIG. 4 is a schematic circuit diagram of the preferred embodiment of the power outage detector depicted in FIG. 1.

FIG. 5 is a schematic circuit diagram of the preferred embodiment of the overvoltage/noise detector depicted in FIG. 1.

FIG. 6 is a functional block and schematic circuit diagram of the low voltage detector depicted in FIG. 1.

FIG. 7 is a schematic circuit diagram of the line switch control depicted in FIG. 1.

FIGS. 8-14 are functional block and schematic circuit diagrams of a preferred embodiment of the auxiliary power supply depicted in FIG. 1.

DETAILED DESCRIPTION OF THE PREFERRED EMBODIMENT

Figure 1:
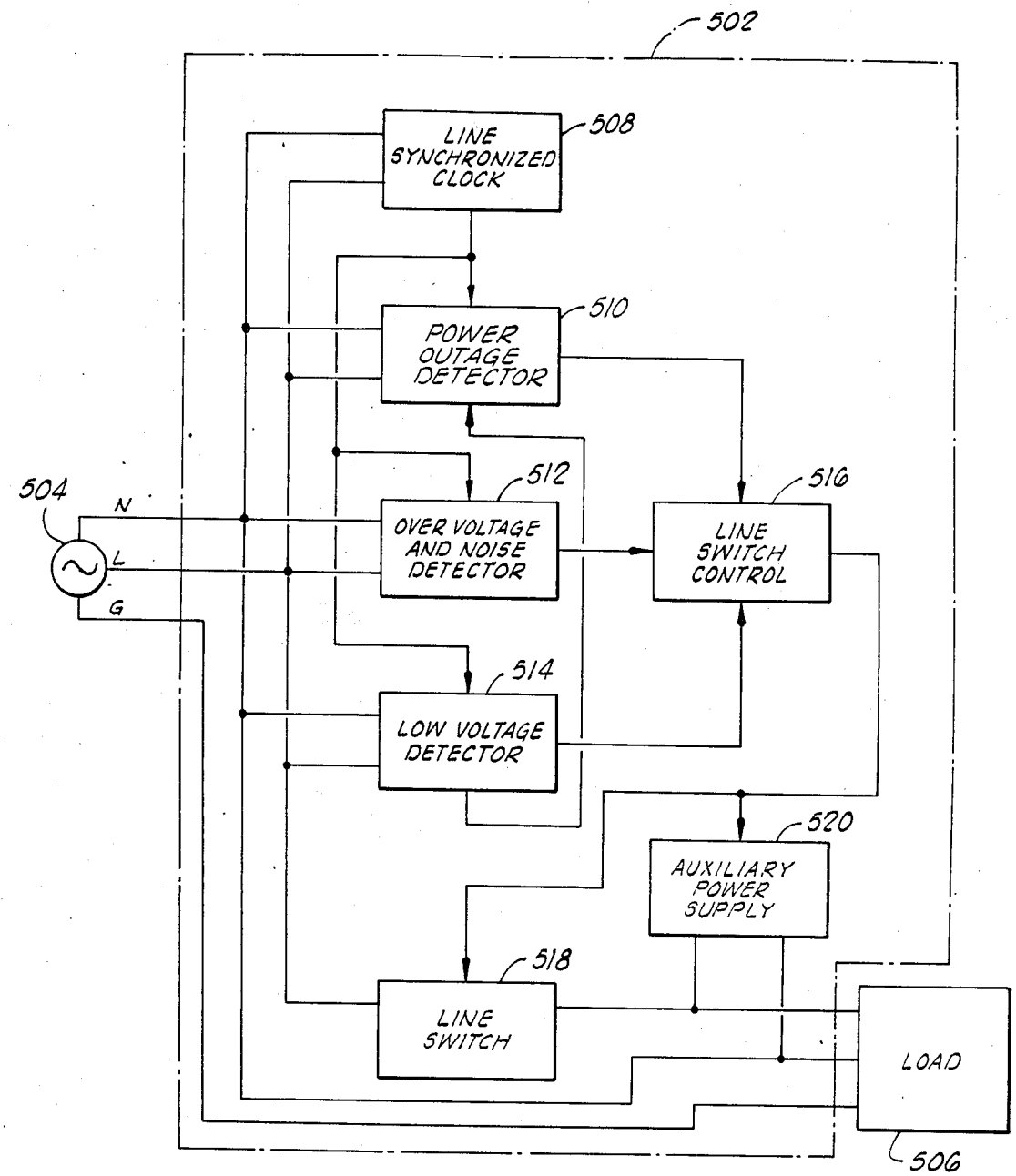
FIG. 1 is a functional block diagram of the preferred embodiment of the present invention.

A functional block diagram of a line synchronized reserve power source 502 constructed in accordance with the preferred embodiment of the present invention is shown in FIG. 1. The reserve power source 502 is interconnected with a primary power source 504 which provides a primary alternating current power signal to a load 506 under normal operating conditions. When an abnormality is detected in the primary power signal, the reserve power supply 502 generates and connects an auxiliary power signal to the load 506 in place of the primary power signal from the primary power supply 504.

The reserve power source 502 includes a line synchronized clock 508 which is connectible to the network over which the primary power signal is provided to the load 506. The line synchronized clock 508 provides a clock signal which controls, at least in part, a power outage detector 510 that provides for instantaneous switching between the primary power supply 504 and the reserve power source 502 when a power outage occurs. The clock signal also provides timing control to an overvoltage/noise detector 512, which is connected to the power signal network for detecting both sustained and instantaneous overvoltage conditions, and to a low voltage detector 514, which is connected to the power signal network for detecting low voltage, brown-out conditions in the primary power signal.

When any one of the conditions monitored by the power outage detector 510, the overvoltage/noise detector 512 and the low voltage detector 514 is detected, a respective switch control signal is provided to a line switch control 516. In response to one of these switch control signals, the line switch control 516 provides a signal which actuates a line switch 518 so that the line switch 518 switches from a first state, wherein the primary power signal from the primary power supply 504 is provided on the load 506, to a second state, wherein the primary power signal is disconnected from the load 506. When the primary power signal is disconnected from the load 506, the auxiliary power signal is provided by an auxiliary power supply 520 forming another part of the reserve power source 502 of the present invention. The auxiliary power supply 520 is enabled to provide the auxiliary power signal in response to the signal from the line switch control 516.

The preferred embodiment of the line synchronized clock 508 is shown in FIG. 2. The preferred embodiment of the line synchronized clock 508 includes a discrete component zero-crossing detector circuit 522 of a type as known to the art. The circuit 522 generates a pulse in synchronization with each zero-crossing of the sinusoidal waveform of the primary power signal. Each pulse is provided at the collector of a transistor 524 forming part of an optical coupling means within the circuit 522.

The output provided from the collector of the transistor 524 is connected to an input of a timer circuit, which circuit in the preferred embodiment includes a model 555 timer integrated circuit chip 526 known to the art. The chip 526 has timing inputs to which a variable resistor-capacitor network 528 is connected for adjustably setting the duty cycle and period of a timing signal provided at the output of the chip 526. This output is connected to a base terminal of a transistor 530 to drive the transistor 530 so that the clock signal of the present invention is provided at a collector terminal of the transistor 530.

In the preferred embodiment the clock 508 is referred to as being "line synchronized" with the primary power signal provided along the network between the primary power supply 504 and the load 506. Synchronization in this context does not necessarily mean commencing or occurring at a time exactly corresponding to the zero-crossing point, but rather this term also includes correspondence to the detection of some magnitude of the primary power signal immediately prior to the respective zero-crossing. This relationship is illustrated by the timing pulses shown in FIGS. 3(a) and (b). Each pulse shown in FIG. 3(b) appears at the collector of the transistor 524 and commences at some predetermined voltage near each zero-crossing of the primary power signal shown in FIG. 3(a), which predetermined voltage is set by the values of the components included in the circuit 522 as known to the art. Each pulse of the type shown in FIG. 3(b) synchronizes the otherwise free-running timer 526 with the main line primary power signal. This synchronization causes a cycle of the timer 526 timing signal to commence in a first state at the time the pulse to FIG. 3(b) commences. This first state or portion of the timing signal terminates, or switches to a second state, a predetermined time thereafter based upon the setting of the variable resistor-capacitor network 528 as known to the art.

An exemplary timing signal output by the timer 526 is shown in FIG. 3(c). This timing signal is inverted by the transistor 530 to provide the clock signal shown in FIG. 3(d). Each period of the clock signal shown in FIG. 3(d) includes a first portion or first state 532 which commences in synchronization with the zero-crossing detected by the circuit 522 and terminates at the predetermined time thereafter. The portion 532 within each period or cycle of the clock signal is followed by a second portion or state 534 which extends from the aforementioned termination to the commencement of the next portion 532 commencing with the next cycle of the timer 526. In the preferred embodiment the timer 526, through the network 528, has a period which is set to free run at a frequency of twice the frequency of the primary power signal so that each cycle of the timing signal (and thus of the clock signal) occurs in correspondence with each zero-crossing of the primary power signal. Within each cycle or period, a suitable duty cycle is set so that an outage response of the present invention will be "instantaneous" as subsequently described. In the preferred embodiment the duty cycle is set so that the first state, commencing in synchronization with the zero-crossings of the primary power signal, has a duration of approximately 270 microseconds; however any suitable duration (such as less than approximately 300 microseconds) which will still allow for an "instantaneous" switchover at a power outage can be used. Therefore, in the preferred embodiment, the termination of the portion 532 of the clock signal occurs prior to the next zero-crossing of the primary power signal.

FIG. 2 also shows a phase switching circuit 536 of the type described and claimed in my co-pending U.S. patent application Ser. No. 776,032, entitled "Alternating Current Power Source with Improved Phase Adjusting Capability" and filed Sept. 13, 1985. The description in this co-pending application is incorporated herein by reference.

The preferred embodiment circuit of the power outage detector 510 is shown in FIG. 4. The preferred embodiment includes pulse generating means for generating a ciontrol pulse commencing when a first magnitude of the primary power source is detected prior to a respective zero-crossing of the primary power signal and terminating when a second magnitude of the primary power signal is detected after the respective zero-crossing of the primary power signal. This means is specifically shown to include a zero-crossing detector integrated circuit 538 of a type as known to the art. The integrated circuit 538 has input means to which a polarized, full-wave rectification of the primary power signal is provided over conductors 539, 540 and across which is connected a resistor 542 for adjusting the phase, or timing, at which the control pulse commences and terminates relative to the first state of the clock signal. In the preferred embodiment, these two magnitudes are equal as will be more particularly described hereinbelow with reference to FIG. 3.

When the integrated circuit 538 detects a zero-crossing as defined by the predetermined magnitude of the primary power signal, the control pulse is provided to a conductor 544 to which a power outage determining means is connected. The power outage determining means is responsive to the clock signal from the clock 508 and to the control pulse from the chip 538 for determining a power outage condition. This condition occurs when the control pulse from the chip 538 is present during a "trip window" time period which is defined during at least part of one of the portions 534 of the clock signal. In the preferred embodiment the trip window exists anywhere between immediately upon the conclusion of a portion 532 of the clock signal and approximately fifteen degrees (15°) before the commencement of a portion 532 of the clock signal. Although the variation is 15° in the preferred embodiment, any suitable variation can be selected by appropriately choosing the value of a resistor 545 connected in series between the collector of the transistor 524 and the synchronizing control input of the timer 526 (FIG. 2). Conversely no power outage condition occurs if the control pulse from the chip 538 exists wholly within the time frame from 15° before the otherwise next portion 532 to the termination of the same portion 532 actually generated. These time periods are graphically illustrated in FIG. 3(d). When at least part of a control pulse exists during a trip window (or, stated differently, when at least a portion of the control pulse temporally coincides with at least a portion of the trip window time period), the power outage determining means provides a switch control signal immediately upon the existence of the control pulse within the trip window.

After a switchover from the primary power source 504 to the auxiliary power supply 520 has occurred, the auxiliary supply 520 will remain connected to the load until the clock signal resynchronizes with the zero-crossings of the primary power signal. This provides a safety feature at the time of switchback.

More specifically, the resistor 545 prevents the internal oscillator of the timer 526 from resynchronizing with a zero-crossing of the primary power signal until a zero-crossing occurs within a leading offset, which is the fifteen degrees (15°) in the preferred embodiment, immediately in front of the leading edge of one of the portions 532. That is, no synchronization occurs if the zero-crossing happens at any time after the leading edge of the portion 532 unless it happens during a subsequent leading offset immediately preceding a subsequent portion 532.

In the FIG. 4 embodiment, the power outage determining means includes light-emitting means for providing an actuation signal in response to the control pulse. The power outage determining means also includes photo-responsive means, having the clock signal and the actuation signal provided thereto, for generating the power outage indicating signal when the actuation signal, corresponding identically with the control pulse, exists during a trip window as has been defined relative to the clock signal. The light-emitting means includes a light-emitting diode 546, and the photo-responsive means includes a photo-responsive transistor 548 which, if not otherwise prevented, becomes conductive when the diode 546 emits light. The base of the transistor 548 is driven by a signal from the low voltage detector circuit shown in FIG. 6. The photo-responsive means also includes connector means for connecting the clock signal in an EXCLUSIVE OR functional relationship with the signal from the transistor 548. This connector means includes a transistor 550 having a collector terminal connected to a base terminal of a transistor 551, which connection is coupled to the emitter terminal of the transistor 548 through a resistor 553, and having an emitter terminal connected to an emitter terminal of the transistor 551 and also to electrical ground. A resistor 552 connects the base terminal of the transistor 550 to the collector terminal of the transistor 530 in the line synchronized clock 508. The collector terminal of the transistor 551 is connected to a terminal, T.P.2, within a low voltage monitor circuit 574 generally depicted in FIG. 6 and more specifically shown in FIG. 13.

In operation, the power outage detector 510 provides an instantaneous switch control signal at the collector of the transistor 551 when a power outage condition is detected. This condition is established through an effective comparison of the trip window portion of the clock signal and the control pulse provided by the zero-crossing detector integrated circuit 538 whereby a power outage is detected whenever any part of the control pulse resulting from the circuit 538 exists within the trip window portion of the clock signal. This is specifically implemented through an EXCLUSIVE OR type function provided by the circuitry including the transistors 548, 550, 551. As shown in FIG. 3(d), the trip window portion of the clock pulse is at a low logic level for the illustrated preferred embodiment. This level makes the transistor 550 non-conductive, which allows the state of the transistor 548 to control the transistor 551. During the portion 532 of the clock signal, the transistor 550 is conductive whereby the base of the transistor 551 is connected to electrical ground, thereby disabling the transistor 551 from responding to any transistor 548 control pulse existing during such time. If a power outage occurs within the fifteen degree (15°) leading offset immediately prior to a leading edge of when the clock pulse 532 would have otherwise occurred, the circuitry shown in FIG. 2 detects this as a zero-crossing whereupon the pulse (or portion) 532 is immediately generated, thereby effectively shifting the "no power outage direct" time period defined by the width of each pulse 532. Thus, the "no power outage detect" time period remains fixed at the width of each pulse 532, but it is subject to being shifted forward by up to fifteen degrees (15°), which is what is intended to be depicted by the "no power outage detect" labelling in FIG. 3(d).

Graphically, FIG. 3(e) shows that the integrated circuit 538 provides the control pulse as a low pulse 554 which commences when the predetermined magnitude or voltage level of the primary power signal shown in FIG. 3(a) is detected. The pulse 554 is terminated when a second magnitude (in the preferred embodiment having an equal value to the first magnitude) is detected. Because a low pulse provided by the conductor 544 to the diode 546 causes the diode 546 to become conductive and light-emitting, this provides the actuation signal to the transistor 548; however, when the transistor 551 is disabled by the portion 532 of the clock signal acting through the transistor 550, the transistor 548 cannot actuate the transistor 551 in response to the actuation signal. This results in no power outage indicating signal being provided at the collector of the transistor 551 when the control pulse 554 is fully embedded within the clock signal portion 532.

When the primary power signal suffers an outage, however, whereby the magnitude of the primary power signal is reduced substantially to zero, there is no voltage after the last detected zero-crossing so the chip 538 will be unable to detect a primary power signal voltage level by which the then existing control pulse 554 can be terminated. FIG. 3(f) shows the primary power signal having an output of $t_{out}$, which is coincidentally within a portion 532 of the clock signal. The control pulse 554 shown in FIG. 3(g) commences when the predetermined voltage level is detected before the last zero-crossing; yet, no immediate power outage is detected because the transistor 551 is disabled by the clock signal. However, because there is no terminating voltage level to be detected in the primary power signal, the pulse 554 extends beyond the termination of the first state of the clock signal represented by the pulse 532. Therefore, when the pulse 532 terminates, the transistor 550 becomes non-conductive, thereby removing the disabling signal from the base of the transistor 551. The transistor 551 is now enabled to respond to the continuing control signal applied through the transistor 548 in response to the continuing pulse 554 of FIG. 3(g). This makes the transistor 551 conductive to the extent that the collector thereof is pulled to electrical ground, thereby providing the switch control signal from the power outage detector 510 to the line switch control 516. If $t_{out}$ first occurs within the trip window, the switch control signal is provided immediately.

This operation of the power outage detector 510 occurs "instantaneously" in that the switch control signal is generated within the length of one of the portions 532 of the clock signal, which length in the preferred embodiment is approximately 270 microseconds, well below any switchover delay that could cause operational problems in a typical load. Therefore, the worst case "instantaneousness" of the operation of the power outage detector 510 can be suitably controlled by adjusting the length of the duty cycle on the timer 526 which establishes the length of the pulse 532. Similarly, the switchover occurring in response to the power outage detector 510 is "instantaneous" and "synchronized" with the zero-crossing of the primary power signal even in a worst case delay during a portion 532 of the clock signal.

The connection of the base of the transistor 548 to the low voltage detector as shown in FIGS. 4 and 6 momentarily or temporarily locks out or prevents operation of the transistor 548, and thus disables the photo-responsive means which prevents a new power outage signal being generated, at switchback when the load is reconnected to the primary power source after it returns from an outage. This prevents "ratcheting" between the primary power source and the auxiliary power supply which might result from power source signal variations occurring at switchback.

The preferred embodiment of the overvoltage/noise detector 512 is schematically illustrated in FIG. 5. In the preferred embodiment, the overvoltage/noise detector 512 is connected to the polarized, full-wave-rectified primary power signal and provides a switch control signal when the primary power signal has a magnitude which exceeds a high voltage threshold level. In the preferred embodiment the detector 512 includes threshold comparison means and means, responsive to the threshold comparison means, for providing another switch control signal in synchronization with the clock signal.

The threshold comparison means includes an integrated circuit chip 556 of a type as shown in FIG. 5 and as known to the art. Included within the chip 556 and connected thereto are elements which provide a means for setting a predetermined threshold value. This includes a variable resistor 558. These elements also provide means for varying the predetermined threshold value when frequencies, referred to herein as noise, above a predetermined frequency are detected in the primary power signal. The elements constructing this means include a resistor 560 and a capacitor 562 providing, in electrical parallel with a resistor 564, a high pass filter having a predetermined cut-off frequency as defined by the values of the resistor 560 and the capacitor 562. The resistor 564 provides part of the means for setting the predetermined threshold value. The high pass filter constructed of the resistor 560 and the capacitor 562 is functional only when a suitable noise component above the cut-off frequency of the high pass filter occurs in the primary power signal. When such a component occurs, the threshold in the preferred embodiment is lowered due to the resultant electrical paralleling of the components of the high pass filter with the resistor 564.

The integrated circuit chip 556 and its connected components shown in FIG. 5 also include means for comparing the primary power signal with the threshold value which has either been maintained at the predetermined value or at a lower predetermined value dependent upon whether a noise component above the cut-off frequency of the high pass filter has been detected. When either threshold is exceeded by the primary power signal, a threshold exceeded signal is provided along a conductor 566 at the output of the chip 556. The conductor 566 connects this threshold exceeded signal of the comparison means to the means for providing a second switch control signal. This means for providing a second switch control signal includes a D-type latch integrated circuit 568 of a type as known to the art. The D-type latch 568 has a clock input to which the clock signal is provided over a conductor 570 and a data input to which the conductor 566 is connected. The output of the latch 568 is provided via a conductor 572 to the line switch control 516.

The foregoing construction of the preferred embodiment of the overvoltage/noise detector 512 synchronizes the switch control signal provided along the conductor 572 with a zero-crossing of the primary power signal because the latch 568 is not actuated until the portion 532 of the clock signal is received along the conductor 570. Clocking occurs on the leading edge of the portion 532 so that synchronization with the zero-crossing of the primary power signal is achieved. Because the clock signal has a frequency of twice the primary power signal frequency in the preferred embodiment, the overvoltage/noise switching control signal will be provided within at most one half cycle of the primary power signal from the generation of the threshold exceeded signal. After the overvoltage/noise condition ceases, switchback to the primary power supply 504 also occurs in synchronization with a zero-crossing because of the operation of the latch 568.

The preferred embodiment of the low voltage detector 514 is illustrated in FIG. 6. This circuit includes a low voltage monitor 574 of a type as disclosed in my co-pending patent application, U.S. patent application Ser. No. 564,495, now U.S. Pat. No. 4,560,886 assigned to the assignee of the present invention. The preferred embodiment of this low voltage monitor 574 is shown in FIG. 13.

The output of the low voltage monitor 574 is provided to an input of a D-type latch 576. The latch 576 has a clock input which is connected by a conductor 578 to the clock signal provided from the line synchronized clock 508. Therefore, as with the overvoltage/noise detector 512, the low voltage detector 514 is synchronized with the zero-crossing of the primary power signal to provide a switch control signal along a conductor 580 when the low voltage monitor 574 detects a low voltage condition. In the preferred embodiment this occurs within a time period of at most one-half cycle of the primary power signal (i.e., one full cycle of the clock signal). Switchback after the low voltage condition ceases is also synchronized through the operation of the latch 576. The conductor 580 is connected to the line switch control 516 as shown in FIG. 7.

A portion of the line switch control 516 has a preferred embodiment schematically illustrated in FIG. 7. The line switch control 516 includes a diode 586 having a cathode connected to the conductor 572 from the overvoltage/noise detector 512. Another diode 588 is included in the line switch control 516 and has a cathode connected to the conductor 580 of the low voltage detector 514. The anodes of the diodes 586, 588 are commonly connected to provide a logical "OR" connection attached to the base of a transistor 590.

When either of the switch control signals is received from the overvoltage/noise detector 512 or the low voltage detector 514, the transistor 590 becomes conductive so that the collector thereof is pulled to the +V voltage of the circuit. This provides a control signal to a transistor 592 having a collector connected by a conductor 594 to the line switch 518. This operation causes the line switch 518 to switch from its first state to its second state whereby the load 506 becomes disconnected from the primary power supply 504. Energization of the load 506 is thereafter provided from the auxiliary power supply 520 which is enabled in response to the signal at the collector of the transistor 590.

Another portion of the preferred embodiment line switch control 516 is shown in FIG. 13 as including the T.P.2 connection and the related circuitry by which the switch control signal of the power outage detector 510 is provided to the junction of a transistor 130 and a resistor 132, which elements will be further discussed hereinbelow.

In the preferred embodiment, the line switch 518 includes a solid state relay of a type as known to the art. Such a solid state relay replaces a relay 15 described in my co-pending patent application, U.S. patent application Ser. No. 564,495, now U.S. Pat. No. 4,560,886 referred to hereinabove. This interchangeability is known to the art.

The auxiliary power supply 520 which provides the auxiliary power signal to the load 506 is, as described hereinabove, of the type disclosed in U.S. Pat. No. 4,560,886. This auxiliary power supply is illustrated in FIGS. 8-14 of the present application. The description of these drawings is given in U.S. patent application Ser. No. 564,495, which description is incorporated herein by reference. In view of this incorporation by reference, only FIGS. 11B and 13 will be referred to specifically herein for purposes of showing how the present invention is incorporated with the auxiliary power supply 520 of FIGS. 8-14.

In FIG. 11B a $\overline{\text{SYNC}}$ terminal of a pulse width modulator integrated circuit chip 56 is connected to the timing signal output of the timer 526 through a diode 596 and to the phase switching circuit 536 as shown in FIG. 2. A $\overline{\text{STDN}}$ terminal of the chip 56 is connected to the phase switching circuit 536 as also indicated in FIG. 2.

In FIG. 13, the low voltage monitor circuit 574 is shown as providing an output on a conductor 600, which is connected to the latch 576 as illustrated in FIG. 6.

A transistor 130 shown in FIG. 13 corresponds to the transistor 592 shown in FIG. 7. Therefore, the collector of the transistor 590 shown in FIG. 7 would be connected to the base of the transistor 130 shown in FIG. 13.

FIG. 13 shows a resistor 602 connecting the conductor 600 from the output of the low voltage monitor to the transistor 130 (592). By leaving the resistor 602 in the circuit as shown, a "low voltage condition" indicated on conductor 600 acts instantly on the transistor 130 (592) at switchover from the primary source to the auxiliary supply, rather than waiting to be synchronized with a zero-crossing through the latch 576 shown in FIG. 6 (other than when a zero-crossing "synchronized" power outage is indicated through T.P.2). To utilize the low voltage synchronization feature of the circuit shown in FIG. 6 at switchover, the resistor 602 would be removed. At switchback from the auxiliary supply to the primary source, however, the latch 576 functions to insure proper synchronization regardless of whether the resistor 602 is used. Synchronized switchover before, and synchronized switchback after, an overvoltage/noise condition occurs via operation of the latch 568 shown in FIG. 5. Synchronized switchback after a power outage also occurs because of the connection of the transistor 551 to the T.P.2 point and the effect of that connection on the operation of the latch 576 (i.e., although the switchover signal on the conductor 600 is removed, the output of the latch 576 still controls the transistor 130 (592) until the next clock signal is received by the latch 576).

If synchronized switchover due to a brown-out is effected by deleting the resistor 602, the collector of the transistor 551 of the power outage detector shown in FIG. 4 should be connected in a suitable manner for still instantaneously acting on the transistor 130 because of the greater need to instantly switchover at a power outage. This need is greater because a typical load is generally less tolerant of a power outage condition than of an overvoltage/noise condition or a brown-out condition.

Additionally, the solid state relay of the present invention is inserted in place of the relay 15 shown in FIG. 13.

The foregoing description of the structure and operation of the present invention provides an explanation of how the present invention monitors the primary power signal from the primary power supply 504 for at least one of a plurality of power failure conditions. In the specific preferred embodiment described, these power failure conditions are a power outage condition, an overvoltage/noise condition, or a low voltage, or brown-out, condition.

Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts can be made by those skilled in the art, which changes are encompssed within the spirit of this invention as defined by the appended claims.

What is claimed is:

1. An apparatus for detecting a power failure in an alternating current power signal, said apparatus comprising:

clock means for providing a clock signal in correspondence with a zero-crossing of said power signal, said clock signal having cycles including a first state, existing for a first time, and a second state, existing for a second time, wherein said first and second times define the period of a cycle of said clock signal and wherein at least a portion of said second time defines a trip window portion of each cycle of said clock signal;

pulse generating means for generating a single control pulse commencing in response to a voltage level of said power signal detected prior to the zero-crossing of said power signal and terminating if a voltage level of said power signal is detected after the zero-crossing of said power signal; and means, responsive to said clock signal and said control pulse, for detecting any part of said control pulse existing at the same time as any part of said trip window portion of said clock signal, which defines the existence of a power outage condition, and for generating a signal indicating a power outage in response to a detected power outage condition.

2. An apparatus as defined in claim 1, wherein:

said pulse generating means includes a zero-crossing detector integrated circuit means, having input means for receiving said power signal, for providing said control pulse; and said means for detecting and for generating includes:

light-emitting means for providing an actuation signal in response to said control pulse; and photo-responsive means, having said clock signal and said actuation signal provided thereto, for generating said signal indicating a power outage when at least a portion of said actuation signal exists simultaneously with at least a portion of said second state of said clock signal defining said trip window portion.

3. An apparatus for instantaneously detecting a power failure in an alternating current power signal, said apparatus comprising:

clock means for providing a clock signal in correspondence with a zero-crossing of said power signal, said clock signal having cycles including a first state, existing for a first predetermined time, and a second state, existing for a second predetermined time, wherein said first and second predetermined times define the period of a cycle of said clock signal;

pulse generating means for generating a control pulse commencing when a predetermined voltage level of said power signal is detected, said pulse generating means including a zero-crossing detector integrated circuit means, having input means for receiving said power signal, for providing said control pulse; and power outage determining means, responsive to at least a portion of said control pulse existing during at least part of the second state of at least one of the cycles of said clock signal, for instantaneously providing a power failure indicating signal when said control pulse and said second state first coincide, said power failure determining means including:

light-emitting means for providing an actuation signal in response to said control pulse, said light-emitting means including a diode; and photo-responsive means, having said clock signal and said actuation signal provided thereto, for generating said power failure indicating signal when at least a portion of said actuation signal exists simultaneously with at least a portion of said second state of said clock signal, said photo-responsive means including:

a first transistor optically coupled to said diode;

a second transistor having a first terminal connected to said first transistor and a second terminal connected to said clock means; and a third transistor having a first terminal connected to said first terminal of said second transistor and having a second terminal through which said power failure indicating signal is provided.

4. An apparatus as defined in claim 1, wherein said first time of said first state of said clock signal is less than approximately 300 microseconds.

5. An apparatus as defined in claim 1, wherein the first state of at least one cycle of said clock signal commences at a time in correspondence with a zero-crossing of said power signal and wherein said first time is approximately 270 microseconds.

6. An apparatus for instantaneously detecting a power failure in an alternating current power signal, said apparatus comprising:

clock means for providing a clock signal in correspondence with a zero-crossing of said power signal, said clock signal having cycles including a first state, existing for a first predetermined time, and a second state, existing for a second predetermined time, wherein said first and second predetermined times define the period of a cycle of said clock signal, said clock means including:

timer means for generating said clock signal so that each cycle thereof has said first and second states; and synchronizing means, responsive to a full-wave rectification of said power signal, for synchronizing the commencement of each first state of said clock signal with a respective zero-crossing of said power signal;

pulse generating means for generating a control pulse commencing when a predetermined voltage level of said power signal is detected, said pulse generating means including zero-crossing detector means, responsive to said full-wave rectification of said power signal, for providing said control pulse in correspondence with the zero-crossings of said power signal; and power failure determining means, responsive to at least a portion of said control pulse existing during at least part of the second state of at least one of the cycles of said clock signal, for instantaneously providing a power failure indicating signal when said control pulse and said second state first coincide, said power failure determining means including:

a light-emitting diode connected to said zero-crossing detector means;

a first transistor optically responsive to said light-emitting diode;

a second transistor connected to said timer means and said first transistor; and a third transistor connected to said first and second transistors and having a terminal through which said power failure indicating signal is provided.

7. A reserve power source for switchably providing an auxiliary power signal to a load when at least one of a plurality of conditions is detected in a primary power signal provided to the load from a primary power supply, said reserve power source comprising:

auxiliary power means for providing said auxiliary power signal;

switch means for connecting said primary power supply with said load when said switch means is in a first state and for disconnecting said primary power supply from said load when said switch means is in a second state;

clock means for providing a periodic clock signal synchronized with a zero-crossing of said primary power signal;

means for providing a switch control signal when said primary power signal has a magnitude which exceeds a magnitude threshold level, said means including:

filter means for detecting when said primary power signal includes at least one frequency component greater than a frequency threshold;

threshold setting means for setting said magnitude threshold level in response to said filter means and for comparing said magnitude of said primary power signal with said magnitude threshold level; and means, responsive to said clock means and said threshold setting means, for generating said switch control signal in synchronization with a zero-crossing of said primary power signal; and switch control means for placing said switch means in said second state in response to said switch control signal, thereby disconnecting said primary power supply from said load, and for enabling said auxiliary power means to provide said auxiliary power signal to said load in synchronization with a zero-crossing of said primary power signal.

8. A reverse power source as defined in claim 7, wherein:

said clock signal includes a first portion which repetitively commences in synchronization with at least one zero-crossing of each cycle of said primary power signal and which terminates thereafter at a time prior to the next zero-crossing of said primary power signal, and said clock signal includes a second portion between successive ones of said first portion wherein at least part of said second portion defines a trip window time period;

said reserve power source further comprises:

pulse generating means for generating a control pulse commencing when a first magnitude of said primary power signal is detected prior to a respective zero-crossing of said primary power signal and terminating when a second magnitude of said primary power signal is detected after said respective zero-crossing of said primary power signal; and power outage detecting means, responsive to said clock signal and said control pulse, for detecting when at least a portion of said control pulse exists during at least part of said trip window time period, thereby defining a power outage condition, and for instantaneously providing a second switch control signal at the time said control pulse first coincides with said trip window time period; and said switch control means is also responsive to said second switch control signal so that said switch means is placed in said second state when said power outage condition occurs.

9. A reserve power source as defined in claim 8, wherein:

said pulse generating means includes:
  a zero-crossing detector integrated circuit means, having input means for receiving said primary power signal and having an output, for providing said control pulse at said output; and
  means, connected to said input means, for selecting the phase at which said control pulse commences relative to said first portion of said clock signal; and said power outage detecting means includes:
  light-emitting means, connected to said output of said integrated circuit means, for providing an actuation signal in response to said control pulse; and
  photo-responsive means, having said clock signal and said actuation signal provided thereto, for generating said second switch control signal in response to said control pulse coinciding with said trip window time period.

10. A reserve power source as defined in claim 9, wherein said first and second magnitudes of said primary power signal at which said control pulse commences and terminates are equal.

11. A reserve power source for switchably providing an auxiliary power signal to a load when at least one of a plurality of conditions is detected in a primary power signal provided to the load from a primary power supply, said reserve power source comprising:

auxiliary power means, connectible to said load, for providing said auxiliary power signal;

switch means for connecting said primary power supply with said load when said switch means is in a first state and for disconnecting said primary power supply from said load when said switch means is in a second state;

clock means for providing a periodic clock signal synchronized with zero-crossings of said primary power signal, said clock signal having two distinguishable portions within each cycle;

first detector means for instantaneously detecting a first condition wherein the magnitude of said primary power signal is reduced substantially to zero, said first detector means including:
  means, connectible to said primary power supply, for generating a control pulse commencing whenever a predetermined magnitude of said primary power signal occurs prior to a respective zero-crossing of said primary power signal and terminating at least whenever a predetermined magnitude of said primary power signal occurs after said respective zero-crossing; and
  means, responsive to said clock signal and said control pulse, for providing a first switch control signal when at least a portion of said control pulse exists during at least a part of a predetermined one of said two distinguishable portions of said clock signal;

second detector means for detecting a second condition wherein said primary power signal includes a magnitude above a first threshold value, said second detector means including means for providing a second switch control signal in synchronization with said clock signal;

third detector means for detecting a third condition wherein the magnitude of said primary power signal is less than a second threshold value, said third detector means including means for providing a third switch control signal in synchronization with said clock signal; and switch control means for placing said switch means in said second state and for enabling said auxiliary power means in response to at least one of said first and second switch control signals so that said auxiliary power signal is provided to said load at a switchover time and for placing said switch means in said first state in response to at least one of said second and third switch control signals so that said primary power signal is provided to said load at a switchback time.

12. A reserve power source as defined in claim 11, wherein said second detector means further includes threshold comparison means having means for setting said first threshold value at a first predetermined threshold value, means for varying said first threshold value from said first predetermined threshold value to a second predetermined threshold value when noise above a predetermined frequency is in said primary power signal, means for comparing said primary power signal with said first threshold value so that a threshold exceeded signal is generated when said primary power signal exceeds said first threshold value, and means for connecting said means for comparing with said means for providing a second switch control signal so that said means for providing a second switch control signal responds to said threshold exceeded signal.

13. A reserve power source as defined in claim 12, wherein:

said means for generating a control pulse includes zero-crossing detector integrated circuit means, having input means for receiving said primary power signal, for providing said control pulse; and said means for providing a first switch control signal includes:
  photo-responsive means, connected to said switch control means, for providing said first switch control signal;
  light-emitting means, connected to said zero-crossing detector integrated circuit means so that said control pulse is applied to said light-emitting means, for providing an actuation signal to actuate said photo-responsive means; and
  connector means for providing said clock signal to said photo-responsive means so that said photo-responsive mdans is prevented from responding to said actuation signal of said light-emitting means during the other predetermined one of said two distinguishable portions of each cycle of said clock signal.

14. A reserve power source as defined in claim 11, wherein:
- said means for generating a control pulse includes zero-crossing detector integrated circuit means, having input means for receiving said primary power signal, for providing said control pulse; and
- said means for providing a first switch control signal includes:
  - photo-responsive means, connected to said switch control means, for providing said first switch control signal;
  - light-emitting means, connected to said zero-crossing detector integrated circuit means so that said control pulse is applied to said light-emitting means, for providing an actuation signal to actuate said photo-responsive means; and
  - connector means for providing said clock signal to said photo-responsive means so that said photo-responsive means is prevented from responding to said actuation signal of said light-emitting means during the other predetermined one of said two distinguishable portions of each cycle of said clock signal.

15. A reserve power source as defined in claim 14, wherein said third detector means includes means for temporarily disabling said photo-responsive means at said switchback time.

16. A reserve power source as defined in claim 14, wherein:
- said second detector means further includes:
  - voltage comparison means for comparing said primary power signal with said first threshold value and for providing a threshold exceeded signal when said primary power signal exceeds said first threshold value,
  - predetermined threshold setting means, connected to said voltage comparison means, for setting a first predetermined threshold value as said first threshold value in said voltage comparison means; and
  - high pass filter means, having a frequency threshold and connected in electrical parallel with at least a portion of said predetermined threshold setting means, for changing said first threshold value from said first predetermined threshold value to a second predetermined threshold value when a component of said primary power signal exceeds said frequency threshold so that said first threshold value is thereby set at a value less than said first predetermined threshold value; and
- said means for providing a second switch control signal includes latch means having first input means for receiving said threshold exceeded signal and having second input means for receiving said clock signal so that said threshold exceeded signal is entered in said latch means in synchronization with said clock signal.

17. A reserve power source as defined in claim 11, wherein:
- said second detector means further includes:
  - voltage comparison means for comparing said primary power signal with said first threshold value and for providing a threshold exceeded signal when said primary power signal exceeds said first threshold value;
  - predetermined threshold setting means, connected to said voltage comparison means, for setting a first predetermined threshold value as said first threshold value in said voltage comparison means; and
  - high pass filter means, having a frequency threshold and connected in electrical parallel with at least a portion of said predetermined threshold setting means, for changing said first threshold value from said first predetermined threshold vaue to a second predetermined threshold value when a component of said primary power signal exceeds said frequency threshold so that said first threshold value is thereby set at a value less than said first predetermined threshold value; and
- said means for providing a second switch control signal includes latch means having first input means for receiving said threshold exceeded signal and having second input means for receiving said clock signal so that said threshold exceeded signal is entered in said latch means in synchronization with said clock signal.

18. A reserve power source as defined in claim 7, wherein:
- said threshold setting means includes:
  - voltage comparison means for comparing said primary power signal with said magnitude threshold level and for providing a threshold exceeded signal, to said means for generating said switch control signal, when said primary power signal exceeds said magnitude threshold level; and
  - a resistor connected to said voltage comparison means; and
- said filter means includes a resistor-capacitor network connected in parallel across said resistor connected to said voltage comparison means.

* * * * *

UNITED STATES PATENT AND TRADEMARK OFFICE
CERTIFICATE OF CORRECTION

PATENT NO. : 4,703,191
DATED : October 27, 1987
INVENTOR(S) : Frank T. Ferguson

It is certified that error appears in the above-identified patent and that said Letters Patent are hereby corrected as shown below:

Column 7, line 51, change "direct"" to --detect"--;

Column 14, line 51, change "reverse" to --reserve--; and

Column 16, line 64, change "mdans" to --means--.

Signed and Sealed this

Fifth Day of April, 1988

Attest:

DONALD J. QUIGG

*Attesting Officer*  *Commissioner of Patents and Trademarks*